(12) United States Patent
Lin et al.

(10) Patent No.: US 7,201,059 B2
(45) Date of Patent: Apr. 10, 2007

(54) MAGNETIC FORCE SENSOR ASSEMBLY FOR WORKHOLDING FIXTURES

(75) Inventors: Yhu-Tin Lin, Rochester Hills, MI (US); Chi-Hung Shen, Troy, MI (US)

(73) Assignee: General Motors Corporation, Detroit, MI (US)

( * ) Notice: Subject to any disclaimer, the term of this patent is extended or adjusted under 35 U.S.C. 154(b) by 96 days.

(21) Appl. No.: 11/053,693

(22) Filed: Feb. 8, 2005

(65) Prior Publication Data

US 2006/0174713 A1    Aug. 10, 2006

(51) Int. Cl.
*G01B 7/16* (2006.01)
(52) U.S. Cl. .................................. 73/779
(58) Field of Classification Search ............ 73/779
See application file for complete search history.

(56) References Cited

U.S. PATENT DOCUMENTS

| | | | |
|---|---|---|---|
| 4,637,119 A * | 1/1987 | Schneider et al. ............ 483/69 |
| 4,771,522 A * | 9/1988 | Osaki ........................ 29/33.2 |
| 4,847,582 A | 7/1989 | Cardone et al. ............. 335/289 |
| 4,956,625 A | 9/1990 | Cardone et al. ............. 335/290 |
| 6,021,707 A * | 2/2000 | Bauer et al. .................... 99/337 |
| 6,182,514 B1 * | 2/2001 | Hodges ........................ 73/722 |
| 6,435,493 B1 * | 8/2002 | Hoover ........................ 269/24 |
| 6,644,637 B1 * | 11/2003 | Shen et al. .................. 269/152 |
| 6,725,924 B2 * | 4/2004 | Davidson et al. ....... 166/250.01 |
| 6,877,729 B2 * | 4/2005 | Lin et al. ....................... 269/25 |
| 2002/0105128 A1 * | 8/2002 | Hoover ........................ 269/24 |
| 2002/0149454 A1 * | 10/2002 | Nishikawa ................... 335/205 |
| 2002/0189806 A1 * | 12/2002 | Davidson et al. ....... 166/250.01 |
| 2004/0102858 A1 * | 5/2004 | Kesil et al. .................... 700/11 |

* cited by examiner

*Primary Examiner*—Max Noori
(74) *Attorney, Agent, or Firm*—Kathryn A. Marra

(57) ABSTRACT

A magnetic force sensor assembly for a workholding fixture includes a magnetic force switch operatively supported by a base of a component disposed on the workholding fixture. The magnetic force sensor assembly also includes a sensor operatively supported by the base of the component to sense a position change of the magnetic force switch and inform a controller that there is sufficient magnetic force between the workholding fixture and the base.

32 Claims, 2 Drawing Sheets

MAGNETIC FORCE SENSOR ASSEMBLY FOR WORKHOLDING FIXTURES

TECHNICAL FIELD

The present invention relates generally to workholding fixtures and, more particularly, to a magnetic force sensor assembly for a workholding fixtures.

BACKGROUND OF THE INVENTION

It is known to provide magnetic chucks or workholding fixtures especially for flexible manufacturing operations. Magnetic chucks have been available for holding some magnetic workpieces. Suitably placed and oriented electrical coils permit the chuck to be magnetized to different levels and demagnetized for locating, securing and removing a magnetizable work piece as is described in the specifications and drawing figures of these patents. However, these chucks have not proven useful for securing and machining non-magnetic workpieces such as, e.g., cast aluminum alloys.

It is also known to provide a workholding fixture for securing and machining non-magnetic workpieces. An example of such a workholding fixture is disclosed in U.S. Pat. No. 6,644,637. In this patent, a workholding fixture includes an electromagnetic chuck and several modular fixture elements for locating, clamping, and supporting non-magnetic workpieces. Such a fixture is also useful for iron or steel workpieces. A magnetic chuck is one that can be energized and de-energized with an electric pulse from a stationary electric power source. Thus, the magnetic chuck provides a fast attach/release capability and a flat surface on which modular workpiece supporting, locating and clamping elements can be securely held by the magnetic force. Preferably, the strength of the magnetic field can be varied from a first level for sensitive and accurate modular element placement to a second, higher level for strongly securing the elements. In addition, the energized magnetic chuck can maintain its magnetic attractive force even when the chuck is disconnected from the power source.

In the above-described workholding fixture, the magnetic chuck should maintain its highest magnetic strength indefinitely when fully energized. However, unexpected loss of magnetic force can still happen due to imperfect surface conditions (e.g., nicks, scratches, chips) between the magnetic chuck and a base plate of the modular fixture elements as well as any possible deterioration of the magnetization circuitry.

One attempt has been made to measure the magnetic field to determine if it has sufficient strength. This attempt required an operator to use a Gauss meter to measure the magnetic field of the chuck through an opening at the bottom thereof. However, this process was labor intensive and costly.

Therefore, it is desirable to provide a magnetic force sensor for a workholding fixture that can measure an amount of magnetic force or magnetic field. It is also desirable to provide a magnetic force sensor to measure magnetic force or magnetic field in a magnetic workholding fixture. It is further desirable to provide a magnetic force sensor that can measure indirectly if magnetic force or magnetic field is sufficient in the magnetic workholding fixture. Thus, there is a need in the art to provide a magnetic force sensor assembly for a workholding fixture that meets these desires.

SUMMARY OF THE INVENTION

It is, therefore, one object of the present invention to provide a magnetic force sensor assembly for a workholding fixture.

It is another object of the present invention to provide a magnetic force sensor assembly to measure a strength of a magnetic force or magnetic field of a magnetic workholding fixture.

To achieve the foregoing objects, the present invention is a magnetic force sensor assembly for a workholding fixture. The magnetic force sensor assembly includes a magnetic force switch operatively supported by a base of a component disposed on the workholding fixture. The magnetic force sensor assembly also includes a sensor operatively supported by the base of the component to sense a position change of the magnetic force switch and inform a controller that there is sufficient magnetic force between the workholding fixture and the base.

One advantage of the present invention is that a magnetic force sensor assembly is provided for a workholding fixture. Another advantage of the present invention is that the magnetic force sensor assembly senses magnetic force or magnetic field of the workholding fixture. Yet another advantage of the present invention is that the magnetic force sensor assembly makes the magnetic workholding fixture more reliable to use because any unexpected loss of magnetic force to an unreliable level will be sensed and the use of the magnetic workholding fixture will be stopped until the magnetic force is at a sufficient level. Still another advantage of the present invention is that the magnetic force sensor assembly can indirectly measure if magnetic force or magnetic field is sufficient in the magnetic workholding fixture. A further advantage of the present invention is that the magnetic force sensor assembly is less labor intensive and less costly.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
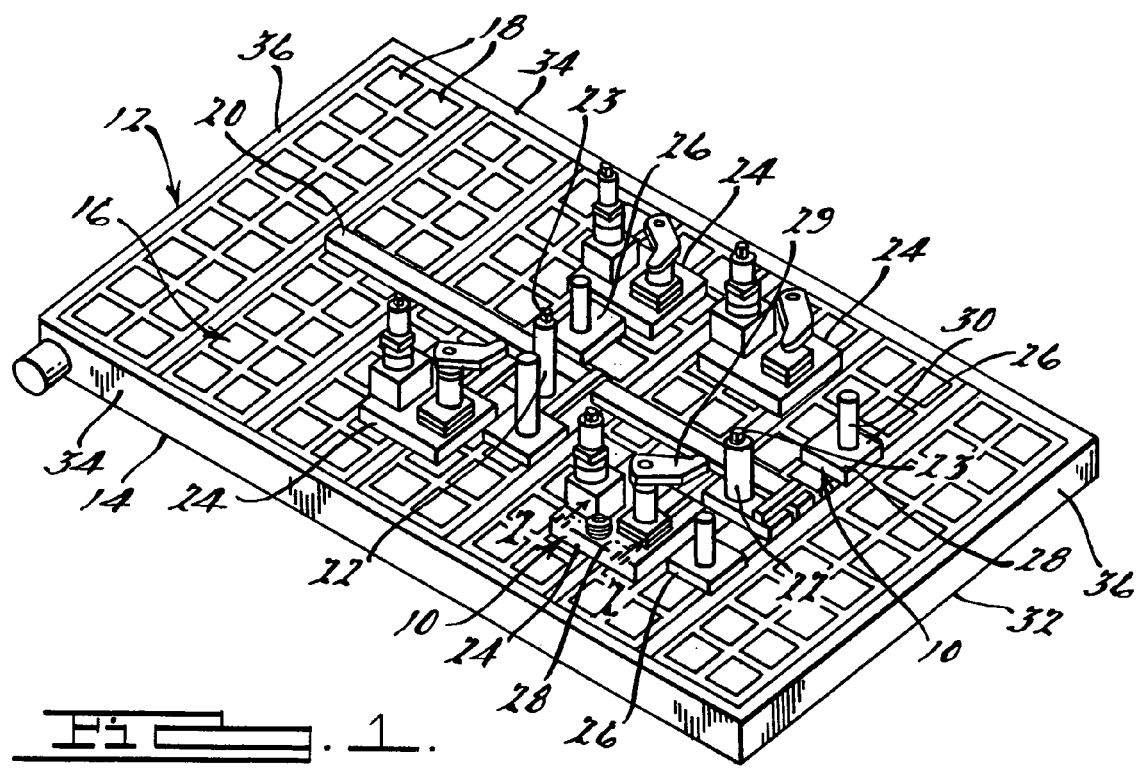
FIG. 1 is a perspective view of a magnetic force sensor assembly, according to the present invention, illustrated in operational relationship with a workholding fixture.
Figure 2:
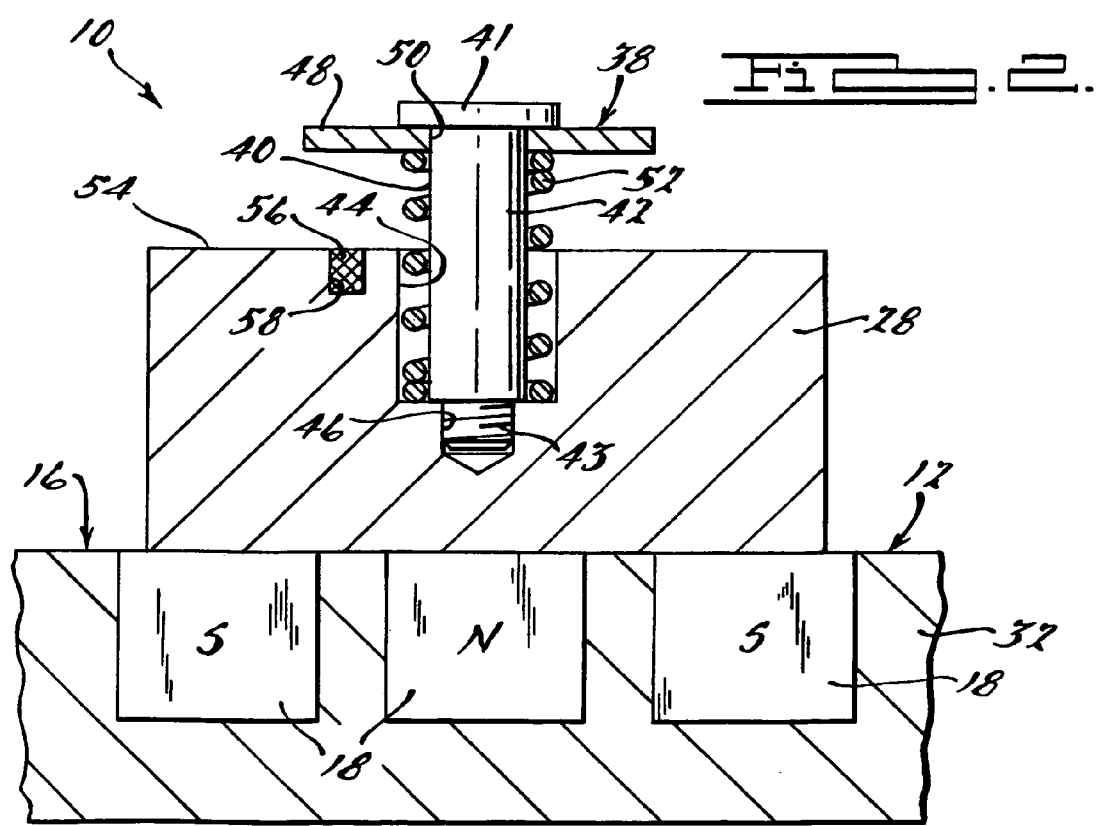
FIG. 2 is a sectional view taken along line 2—2 of FIG. 1.

Referring to the drawings and in particular FIGS. 1 and 2, one embodiment of a magnetic force sensor assembly 10, according to the present invention, is shown for a workholding fixture, generally indicated at 12. The workholding fixture 12 allows for machining of a non-magnetic workpiece such as an aluminum alloy cylinder head (not shown) for an automotive vehicle engine. The workholding fixture 12 is a reconfigurable, magnetic fixture to support and hold the cylinder head. The workholding fixture 12 includes a magnetic chuck 14 that, in this example, has a complex flat rectangular working surface, generally indicated at 16. The magnetic chuck 14 has at least one, preferably a plurality of magnetic pole elements 18. It should be appreciated that, applied to the surface 16 of chuck 14, there are a number of modular fixture elements that are movable to accommodate varying workpiece shapes or machining positions.

The workholding fixture 12 also includes a rigid guide rail 20 that is bolted, or otherwise suitably fixed, to the surface 16 of the magnetic chuck 14. The guide rail 20 is illustrated as straight, but it may be of many desired length or configuration. Also, clamped to guide rail 20 are two locator post elements 22 that are mechanically fixed to the surface 16 of the magnetic chuck 14. On the top of each locator posts 22 are pins 23 that are shaped and located for fitting into locator holes (not shown) formed in the bottom of the cylinder head. The locator holes serve to facilitate precise location of the workpiece for machining operations. It should be appreciated that the guide rail 20 and locator posts 22 are important in precisely locating and rigidly supporting a massive work piece such as a cylinder head. It should also be appreciated that the guide rail 20 and locator posts 22 assist the magnetic chuck 14 in keeping the workpiece from sliding transversely on the surface 16 under dynamic or impact machining forces.

The workholding fixture 12 includes at least one, preferably a plurality of modular fixture elements. The modular fixture elements, in one embodiment, are a plurality of self-contained modular hydraulically adjustable and actuated clamping elements 24 and several modular support elements 26 of fixed height that are attached by magnetic attraction to flat surface 16 of magnetic chuck 14. Both the clamping elements 24 and support elements 26 are shown schematically in FIG. 1. In FIG. 1, the clamping elements 24 are identical to each other and the support elements 26 are identical to each other. The clamping elements 24 have a base 28 with a clamping arm 29 rotatable between an open and closed position. The support elements 26 have a base 28 with a post 30 of fixed length. It should be appreciated that the use of identical clamping elements 24 and support elements 26 simplifies inventory and reconfiguration of the workholding fixture 12, but these elements don't have to be of common design.

It should be appreciated that, while the guide rail 20 and locator posts 22 are mechanically attached to the magnetic chuck 14, the clamping elements 24 and support elements 26 are held to the surface 16 by the magnetic field of the magnetic chuck 14.

Referring to FIG. 1, the magnetic chuck 12 is larger than a footprint of the cylinder head. In one embodiment, the magnetic chuck 12 has a steel base 32 with opposing rectangular side walls 34, 36. Supported on the base 32 and confined within the side walls 34, 36 are many steel cubes 18 that serve to concentrate magnetic flux and are magnetic poles. Only the upper flat surfaces of the cubes are seen in FIG. 1 and there are 126 such pole surfaces in this embodiment. Each polar square (50 mm by 50 mm in one embodiment), is an independent magnet body presenting a magnetic pole at the surface 16. Each such square is surrounded on the other four cube sides by smaller magnets of opposite polarity. Embedded electric coils serve to magnify and demagnify the magnetic pieces as illustrated, for example, in FIGS. 1–3 of the above referenced U.S. Pat. No. 4,956,625. The coils around the reversible magnetic poles 18 can be energized to generate a strong momentary. electromagnetic field and they are capable of reversing the polarity of the magnetic chuck 14. Thus a relatively low magnetic field may be initially applied to assist in holding and locating the clamping elements 24 and the support elements 26 without jerking them to the surface 16 of the magnetic chuck 14. But the magnetic field can be substantially increased to strongly hold the elements 24 and 26 to the surface 16 of the magnetic chuck 14. It should be appreciated that, when it is time to reconfigure the workholding fixture 12, the magnetic field is partially turned off and the elements 24 and 26 removed. It should also be appreciated that the external frame of the magnetic chuck 14 has the mechanical function of containing the magnetic components. It should further be appreciated that the external frame of the magnetic chuck 14 also serves to convey the magnetic flux lines so as to insulate the active surface of the magnetic chuck 14 from other machine or processing elements.

Referring to FIGS. 1 and 2 and describing only one of the magnetic force sensor assemblies 10, according to the present invention, the magnetic force sensor assembly 10 includes a magnetic force switch, generally indicated at 38, cooperating with the base 28 of a respective one of the clamping elements 24 and support elements 26. The magnetic force switch 38 includes a post 40. The post 40 has a head portion 41 extending radially and a shaft portion 42 extending axially from the head portion 41. The head portion 41 is generally circular in shape. The shaft portion 42 is generally cylindrical and circular in cross-sectional shape. The shaft portion 42 extends axially and has a threaded end portion 43. The post 40 is at least partially disposed in an instrumentation cavity 44 of the base 28 and the threaded end portion 43 threadably engages a threaded portion 46 of the instrumentation cavity 44 in the base 28. The post 40 is made of a non-ferrous material such as brass or copper. It should be appreciated that the post 40 is fixed or non-movable relative to the base 28.

The magnetic force switch 38 also includes a sensing plate 48 disposed about the post 40. The sensing plate 48 is generally circular in shape. The sensing plate 48 has a diameter greater than a diameter of the instrumentation cavity 44. The sensing plate 48 has an aperture 50 extending therethrough to receive the shaft portion 42 of the post 40. The sensing plate 48 is movable along the shaft portion 42 between the head portion 41 and the base 28. The sensing plate 48 is made of a ferrous material such as mild carbon steel.

The magnetic force switch 38 further includes a spring 52 disposed about the post 40 between the sensing plate 48 and a bottom of the instrumentation cavity 44 in the base 28. The spring 52 is a compression spring of a coil type. The spring 52 urges the sensing plate 48 away from a top surface 54 of the base 28. The spring 52 is made of a non-magnetizable metal material such as copper or stainless steel. It should be appreciated that the stiffness and preload of the spring 52 can be such that the sensing plate 48 can only stick to the magnetized base 28 when the magnetic field of the magnetic chuck 14 is set to a specific strength level.

The magnetic force sensor assembly 10 includes a sensor 56 operatively supported by the base 28. The sensor 56 is of a proximity type. In one embodiment, the sensor 56 is embedded is a recess 58 in the top surface 54 of the base 28. In another embodiment, the sensor 56 is exterior to the base 28. The sensor 56 communicates with a machine controller (not shown) either by wire or wireless communication. It should be appreciated that, when the sensing plate 48 is in contact with the base 28, the sensor 56 will pick up the position change of the sensing plate 48 and inform the machine controller that there is sufficient magnetic force between the magnetic chuck 14 and the base 28.

In operation, the base plate 28 of the clamping element 24 and/or support element 26 is attached to the magnetic chuck 14. The strength of the magnetic force from the magnetic chuck 14 will be reflected on the top surface 54 of the base plate 28 as long as the surface 54 is not too far away from the magnetic field transmitted from the magnetic chuck 14 to the base plate 28. The stronger the magnetic field is, the firmer will the base plate 28 be clung to the magnetic chuck 14. In turn, it will be harder to pull apart an iron or steel object that sits on top of the base plate 28. When the sensing plate 48 is in contact with the base plate 28, the proximity sensor 56 embedded or exterior to the base plate 28 will pick up the position change of the sensing plate 48 and inform the machine controller that there is sufficient magnetic force between the magnetic chuck 14 and the base plate 28.

Figure 3:
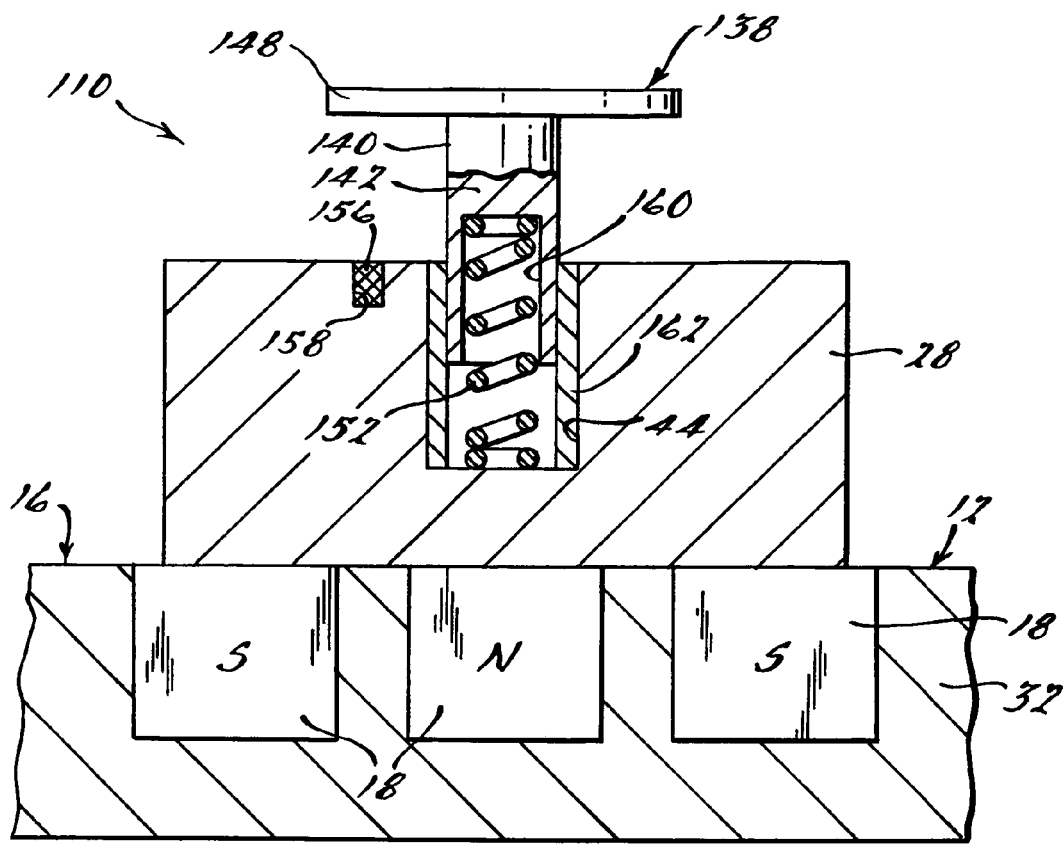
FIG. 3 is a view similar to FIG. 2 of another embodiment, according to the present invention, of the magnetic force sensor assembly and workholding fixture of FIG. 1.

Referring to FIG. 3, another embodiment, according to the present invention, of the magnetic force sensor assembly 10 is shown. Like parts of the magnetic force sensor assembly 10 have like reference numerals increased by one hundred (100). In this embodiment, the magnetic force sensor assembly 110 includes a magnetic force switch, generally indicated at 138, cooperating with the base 28 of a respective one of the clamping elements 24 and the support elements 26. The magnetic force switch 138 includes a post 140. The post 140 has a shaft portion 142 extending axially. The shaft portion 142 is generally cylindrical and circular in cross-sectional shape. The shaft portion 142 has a cavity 160 extending axially therein for a function to be described. The post 140 is at least partially disposed in an instrumentation cavity 44 of the base 28. The post 140 is made of a ferrous material such as steel. It should be appreciated that the post 140 is movable relative to the base 28.

The magnetic force switch 138 also includes a sleeve 162 disposed in the instrumentation cavity 44 and about the shaft-portion 142 of the post 140. The sleeve 162 is generally tubular and circular in cross-sectional shape. The sleeve 168 is made of a non-ferrous material such as brass or copper. It should be appreciated that the sleeve 162 is fixed to the base 128 and the post 140 is movable relative to the sleeve 162.

The magnetic force switch 138 also includes a sensing plate 148 attached to the post 140. The sensing plate 148 is generally circular in shape. The sensing plate 148 has a diameter greater than a diameter of the instrumentation cavity 44. The sensing plate 148 is fixed relative to the shaft portion 142. The sensing plate 148 is made of a ferrous material, such as steel. The sensing plate 148 may be a integral, unitary, and one-piece with the post 140.

The magnetic force switch 138 includes a spring 152 disposed partially in the cavity 160 of the post 140 between a top of the cavity 160 and a bottom of the instrumentation cavity 44 in the base 28. The spring 152 is a compression spring of a coil type. The spring 152 urges the post 140 and sensing plate 148 away from the top surface 54 of the base 28. The spring 152 is made of a metal material. It should be appreciated that the stiffness and preload of the spring 152 can be such that the sensing plate 148 can only stick to the magnetized base 28 when the magnetic field of the magnetic chuck 14 is set to a specific strength level.

The magnetic force sensor assembly 110 includes a sensor 156 operatively supported by the base 28. The sensor 156 is of a proximity type. In one embodiment, the sensor 156 is embedded is a recess 158 in the top surface 54 of the base 28. In another embodiment, the sensor 156 is exterior to the base 28. The sensor 156 communicates with a machine controller (not shown) either by wire or wireless communication. The operation of the magnetic force sensor assembly 110 is similar to the operation of the magnetic force sensor assembly 10. It should be appreciated that, when the sensing plate 148 is in contact with the base 28, the sensor 156 will pick up the position change of the sensing plate 148 and inform the machine controller that there is sufficient magnetic force between the magnetic chuck 14 and the base 28.

Figure 4:
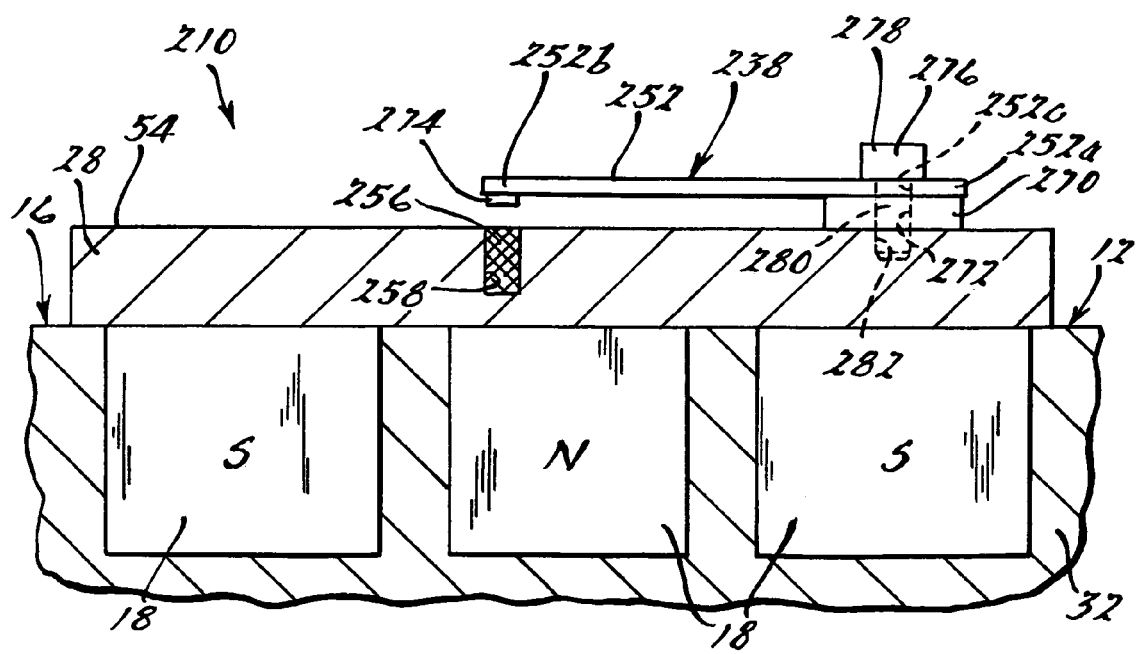
FIG. 4 is a view similar to FIG. 2 of yet another embodiment, according to the present invention, of the magnetic force sensor assembly and workholding fixture of FIG. 1.

Referring to FIG. 4, yet another embodiment according to the present invention, of the magnetic force sensor assembly 10 is shown. Like parts of the magnetic force sensor assembly 10 have like reference numerals increased by two hundred (200). In this embodiment, the magnetic force sensor assembly 210 includes a magnetic force switch, generally indicated at 238, cooperating with the base 28 of a respective one of the clamping elements 24 and the support elements 26. The magnetic force switch 238 includes a spacer 270. The spacer 270 is generally circular or rectangular in shape. The spacer 270 is made of a metal material such as carbon steel. The spacer 270 has an aperture 272 extending axially therein for a function to be described. The spacer 270 is disposed against the top surface 54 of the base 28.

The magnetic force switch 138 includes a spring 252 having a first end 252a disposed against the spacer 270. The spring 252 is of a leaf spring type. The spring 252 is generally rectangular in shape. The spring 252 has an aperture 252c extending axially through the first end 252a for a function to be described. The spring 252 extends longitudinally from the first end 252a to a second end 252b that is cantilevered over the top surface 54 of the base 28. The spring 252 is made of a metal material such as carbon steel. It should be appreciated that the stiffness of the spring 252 can be such that it can only stick to the magnetized base 28 when the magnetic field of the magnetic chuck 14 is set to a specific strength level.

The magnetic force switch 238 also includes a contact tip 274 attached to the spring 252. The contact tip 274 is generally circular or rectangular in shape. The contact tip 274 is fixed to the second end 252b of the spring 252 by suitable means such as an adhesive or spot welding. The contact tip 274 is made of a metal material such as carbon steel.

The magnetic force switch 238 also includes a fastener 276 to attach the spring 252 and spacer 270 to the base 28. The fastener 276 has a head portion 278 extending radially and a shaft portion 280 extending axially from the head portion 278. The shaft portion 280 is at least partially threaded to extend through the apertures 252c and 272 in the spring 252 and spacer 270 and threadably engage a threaded cavity 282 in the base 28. The head portion 278 abuts or contacts the spring 252 to sandwich the first end 252a of the spring 252 and spacer 270 between the base 28 and the head portion 278. It should be appreciated that the fastener 276 is conventional and known in the art.

The magnetic force sensor assembly 210 includes a sensor 256 operatively supported by the base 28. The sensor 256 is of a proximity type. In one embodiment, the sensor 256 is embedded is a recess 258 in the top surface 54 of the base 28. In another embodiment, the sensor 256 is exterior to the base 28. The sensor 256 communicates with a machine controller (not shown) either by wire or wireless communication. The operation of the magnetic force sensor assembly 210 is similar to the operation of the magnetic force sensor assembly 10. It should be appreciated that, when the contact tip 274 is in contact with the base 28, the sensor 256 will pick up the position change of the contact tip 274 and inform the machine controller that there is sufficient magnetic force between the magnetic chuck 14 and the base 28.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims the present invention may be practiced other than as specifically described.

The invention claimed is:

1. A magnetic force sensor assembly for a workholding fixture comprising:
   a magnetic force switch operatively supported by a base of a component disposed on the workholding fixture, said magnetic force switch including a sensing element disposed above the base of the component and movable relative to the base of the component; and
   a sensor operatively supported by the base of the component to sense a position change of said sensing element of said magnetic force switch and inform a controller that there is sufficient magnetic force between the workholding fixture and the base.

2. A magnetic force sensor assembly for a workholding fixture comprising:
   a magnetic force switch operatively supported by a base of a component disposed on the workholding fixture;
   a sensor operatively supported by the base of the component to sense a position change of said magnetic force switch and inform a controller that there is sufficient magnetic force between the workholding fixture and the base; and
   wherein said magnetic force switch comprises a post at least partially disposed in an instrumentation cavity of the base.

3. A magnetic force sensor assembly as set forth in claim 2 wherein said post is fixed relative to the base.

4. A magnetic force sensor assembly as set forth in claim 2 wherein said post is movable relative to the base.

5. A magnetic force sensor assembly as set forth in claim 2 wherein said post is made of a non-ferrous material.

6. A magnetic force sensor assembly as set forth in claim 2 wherein said post is made of a ferrous material.

7. A magnetic force sensor assembly as set forth in claim 2 wherein said post has a head portion extending radially and a shaft portion extending axially from said head portion.

8. A magnetic force sensor assembly as set forth in claim 7 wherein said shaft portion has a threaded end portion threadably engaging a threaded portion of the instrumentation cavity.

9. A magnetic force sensor assembly as set forth in claim 7 wherein said shaft portion has a cavity extending axially therein.

10. A magnetic force sensor assembly as set forth in claim 9 including a spring at least partially disposed in said cavity between a top of said cavity and a bottom of the instrumentation cavity.

11. A magnetic force sensor assembly as set forth in claim 10 wherein said spring comprises a coil spring.

12. A magnetic force sensor assembly as set forth in claim 7 including a sensing plate cooperating with said shaft portion.

13. A magnetic force sensor assembly as set forth in claim 12 wherein said sensing plate is disposed about said shaft portion and movable relative to said shaft portion.

14. A magnetic force sensor assembly as set forth in claim 12 wherein said sensing plate is attached to said shaft portion and fixed relative to said shaft portion.

15. A magnetic force sensor assembly as set forth in claim 12 wherein said sensing plate is made of a ferrous material.

16. A magnetic force sensor assembly as set forth in claim 12 including a spring disposed about said shaft portion between said sensing plate and a bottom of the instrumentation cavity.

17. A magnetic force sensor assembly as set forth in claim 12 wherein said sensing plate has a diameter greater than a diameter of the instrumentation cavity.

18. A magnetic force sensor assembly as set forth in claim 7 including a sleeve disposed in the instrumentation cavity and about a portion of said shaft portion, said shaft portion being movable relative to said sleeve.

19. A magnetic force sensor assembly as set forth in claim 18 wherein said sleeve is made of a non-ferrous material.

20. A magnetic force sensor assembly as set forth in claim 1 wherein said magnetic force switch comprises a spacer supported by the base.

21. A magnetic force sensor assembly as set forth in claim 20 including a spring having a first end supported by said spacer and a second end cantilevered over the base.

22. A magnetic force sensor assembly as set forth in claim 21 wherein said spring is a leaf spring.

23. A magnetic force sensor assembly as set forth in claim 21 wherein said spring is a made of a carbon steel.

24. A magnetic force sensor assembly as set forth in claim 21 including a contact tip supported by said second end of said spring.

25. A magnetic force sensor assembly as set forth in claim 24 wherein said contact tip is a made of a carbon steel.

26. A magnetic force sensor assembly as set forth in claim 21 including a fastener extending through said first end of said spring and said spacer to secure said spring and said spacer to the base.

27. A magnetic force sensor assembly for a workholding fixture comprising:
   a magnetic force switch operatively supported by a base of a component disposed on the workholding fixture;
   a sensor operatively supported by the base of the component to sense a position change of said magnetic force switch and inform a controller that there is sufficient magnetic force between the workholding fixture and the base; and
   wherein said sensor is disposed in a recess in a top surface of the base.

28. A magnetic force sensor assembly as set forth in claim 1 wherein said sensor is a proximity sensor.

29. A workholding fixture comprising:
   a magnetic chuck;
   a component disposed on a surface of said magnetic chuck and having a base held by a magnetic field to the surface of said magnetic chuck;
   a magnetic force switch operatively supported by said base; and
   a sensor operatively supported by said base to sense a position change of said magnetic force switch and inform a controller that there is sufficient magnetic force between said magnetic chuck and said base.

30. A magnetic force sensor assembly for a workholding fixture comprising:
   a magnetic force switch operatively supported by a base of a component disposed on the workholding fixture, said magnetic force switch comprising a post at least partially disposed in an instrumentation cavity of the base;
   said post being made of a non-ferrous material and having a head portion extending radially and a shaft portion extending axially from said head portion, said shaft portion having a threaded end portion threadably engaging a threaded portion of the instrumentation cavity;

a sensing plate made of a ferrous material disposed about said shaft portion and movable relative to said shaft portion;

a spring disposed about said shaft portion between said sensing plate and a bottom of the instrumentation cavity; and a proximity sensor operatively supported by the base of the component to sense a position change of said magnetic force switch and inform a controller that there is sufficient magnetic force between the workholding fixture and the base.

31. A magnetic force sensor assembly for a workholding fixture comprising:

a magnetic force switch operatively supported by a base of a component disposed on the workholding fixture, said magnetic force switch comprising a post at least partially disposed in an instrumentation cavity of the base;

said post being made of a non-ferrous material and having a head portion extending radially and a shaft portion extending axially from said head portion, said shaft portion having a cavity extending axially therein;

a sleeve made of a non-ferrous material disposed in the instrumentation cavity and about a portion of said shaft portion, said shaft portion being movable relative to said sleeve;

a spring at least partially disposed in said cavity between a top of said cavity and a bottom of the instrumentation cavity;

a proximity sensor operatively supported by the base of the component to sense a position change of said magnetic force switch and inform a controller that there is sufficient magnetic force between the workholding fixture and the base.

32. A magnetic force sensor assembly for a workholding fixture comprising:

a magnetic force switch operatively supported by a base of a component disposed on the workholding fixture, said magnetic force switch comprising a spacer supported by the base, a leaf spring having a first end supported by said spacer and a second end cantilevered over the base, and a contact tip supported by said second end of said spring;

a fastener extending through said first end of said spring and said spacer to secure said spring and said spacer to the base; and a proximity sensor operatively supported by the base of the component to sense a position change of said magnetic force switch and inform a controller that there is sufficient magnetic force between the workholding fixture and the base.

* * * * *